United States Patent
Fradet et al.

(10) Patent No.: US 10,594,494 B2
(45) Date of Patent: Mar. 17, 2020

(54) MULTIPLE AUTHORIZATION MODULES FOR SECURE PRODUCTION AND VERIFICATION

(71) Applicant: INEXTO SA, Lausanne (CH)

(72) Inventors: Erwan Fradet, Grandvaux (CH); Patrick Chanez, Cheyres (CH); Philippe Chatelain, Chavornay (CH)

(73) Assignee: Inexto SA, Lausanne (CH)

( * ) Notice: Subject to any disclaimer, the term of this patent is extended or adjusted under 35 U.S.C. 154(b) by 0 days.

(21) Appl. No.: 15/742,503

(22) PCT Filed: Aug. 25, 2016

(86) PCT No.: PCT/EP2016/070137
§ 371 (c)(1),
(2) Date: Jan. 6, 2018

(87) PCT Pub. No.: WO2017/032860
PCT Pub. Date: Mar. 2, 2017

(65) Prior Publication Data
US 2018/0191505 A1    Jul. 5, 2018

Related U.S. Application Data

(60) Provisional application No. 62/209,342, filed on Aug. 25, 2015.

(51) Int. Cl.
*H04L 9/32* (2006.01)
*G06Q 10/08* (2012.01)
(Continued)

(52) U.S. Cl.
CPC ........... *H04L 9/3247* (2013.01); *G06Q 10/08* (2013.01); *G06Q 30/0185* (2013.01); *H04L 9/0877* (2013.01); *H04L 63/12* (2013.01)

(58) Field of Classification Search
CPC ..... H04L 9/3247; H04L 9/0877; H04L 63/12; G06Q 10/08; G06Q 30/0185
See application file for complete search history.

(56) References Cited

U.S. PATENT DOCUMENTS 4,035,615 A    7/1977    Best et al.
4,094,244 A    6/1978    Edwards et al.
(Continued)

FOREIGN PATENT DOCUMENTS

CN    101354753    1/2009
CN    101609626    12/2009
(Continued)

OTHER PUBLICATIONS

Modi et al., "Securing the Manufacturing Environment using Biometrics", Oct. 2005, Proceedings 39th Annual 2005 International Carnahan Conference on Security Technology, pp. 275-278 (Year: 2005).*

(Continued)

*Primary Examiner* — Kenneth W Chang

(57) ABSTRACT

The invention relates to a system of obtaining authorization where there are multiple authorization modules. When an authorization is provided by a module, it is combined with a security token, digital signature or encryption identifying which module provided the authorization. To obtain a full authorization, multiple authorization modules may be required and these modules can be connected in parallel and or in series with each other.

23 Claims, 4 Drawing Sheets

(51) Int. Cl.
*H04L 29/06* (2006.01)
*G06Q 30/00* (2012.01)
*H04L 9/08* (2006.01)

(56) References Cited

U.S. PATENT DOCUMENTS

| | | |
|---|---|---|
| 4,354,101 A | 10/1982 | Hester et al. |
| 4,463,250 A | 7/1984 | McNeight et al. |
| 4,529,871 A | 7/1985 | Davidson |
| 4,860,226 A | 8/1989 | Martin et al. |
| 4,963,719 A | 10/1990 | Brooks et al. |
| 5,382,779 A | 1/1995 | Gupta |
| 5,467,433 A | 11/1995 | Lamprecht, Jr. et al. |
| 5,621,864 A | 4/1997 | Benade et al. |
| 5,646,389 A | 7/1997 | Bravman et al. |
| 5,767,498 A | 6/1998 | Heske, III et al. |
| 5,805,779 A | 9/1998 | Christopher et al. |
| 5,837,983 A | 11/1998 | Actis et al. |
| 5,850,080 A | 12/1998 | Herzig |
| 5,892,900 A | 4/1999 | Ginter et al. |
| 5,930,215 A | 7/1999 | Fite et al. |
| 5,974,150 A | 10/1999 | Kaish et al. |
| 6,069,955 A | 5/2000 | Coppersmith et al. |
| 6,122,403 A | 9/2000 | Rhoads |
| 6,134,561 A | 10/2000 | Brandien et al. |
| 6,212,638 B1 | 4/2001 | Lee et al. |
| 6,217,966 B1 | 4/2001 | Finster et al. |
| 6,226,619 B1 | 5/2001 | Halperin et al. |
| 6,260,029 B1 | 7/2001 | Critelli |
| 6,272,634 B1 | 8/2001 | Tewfik et al. |
| 6,371,375 B1 | 4/2002 | Ackley et al. |
| 6,442,276 B1 | 8/2002 | Doljack |
| 6,456,729 B1 | 9/2002 | Moore |
| 6,546,729 B2 | 4/2003 | Hellat et al. |
| 6,547,137 B1 | 4/2003 | Begelfer et al. |
| 6,712,275 B1 | 3/2004 | Borg |
| 6,725,366 B1 | 4/2004 | Swanberg |
| 6,832,202 B1 * | 12/2004 | Schuyler .......... G06Q 10/06311 |
| | | 705/7.26 |
| 6,892,947 B1 | 5/2005 | Jam et al. |
| 6,963,846 B1 | 11/2005 | Kelly et al. |
| 6,996,543 B1 | 2/2006 | Coppersmith et al. |
| 7,028,901 B2 | 4/2006 | Carlson |
| 7,188,258 B1 | 3/2007 | Aggarwal et al. |
| 7,246,748 B1 | 7/2007 | Feuerman et al. |
| 7,267,271 B2 | 9/2007 | Rhea |
| 7,283,630 B1 | 10/2007 | Doljack |
| 7,497,379 B2 | 3/2009 | Chen et al. |
| 7,539,868 B2 * | 5/2009 | Balard .................. G06F 21/10 |
| | | 713/175 |
| 8,037,294 B2 * | 10/2011 | Nochta .................. G07F 7/08 |
| | | 380/201 |
| 8,175,578 B2 | 5/2012 | McCown et al. |
| 2001/0047340 A1 | 11/2001 | Snow et al. |
| 2002/0053796 A1 | 5/2002 | McCann et al. |
| 2002/0091593 A1 | 7/2002 | Fowler |
| 2002/0158133 A1 | 10/2002 | Conzola et al. |
| 2002/0158137 A1 | 10/2002 | Grey et al. |
| 2003/0042312 A1 | 3/2003 | Cato |
| 2003/0051767 A1 | 3/2003 | Coccaro et al. |
| 2003/0074223 A1 | 4/2003 | Hickle et al. |
| 2003/0126034 A1 | 7/2003 | Cheney et al. |
| 2004/0024790 A1 | 2/2004 | Everett |
| 2004/0084530 A1 | 5/2004 | McQueen et al. |
| 2004/0117265 A1 | 6/2004 | Hoffman |
| 2004/0140362 A1 | 7/2004 | Allen |
| 2004/0172260 A1 | 9/2004 | Junger et al. |
| 2004/0212480 A1 | 10/2004 | Carrender et al. |
| 2005/0006469 A1 | 1/2005 | Nonneman et al. |
| 2005/0097054 A1 | 5/2005 | Dillon |
| 2005/0108044 A1 | 5/2005 | Koster |
| 2005/0127176 A1 | 6/2005 | Dickinson et al. |
| 2005/0189255 A1 | 9/2005 | Safian |
| 2005/0234823 A1 | 10/2005 | Schimpf |
| 2005/0246237 A1 | 11/2005 | Hudetz et al. |
| 2005/0273369 A1 | 12/2005 | Ota et al. |
| 2005/0273434 A1 | 12/2005 | Lubow |
| 2005/0288938 A1 | 12/2005 | Date et al. |
| 2006/0011726 A1 | 1/2006 | Chen et al. |
| 2006/0080190 A1 | 4/2006 | Furukawa et al. |
| 2006/0091209 A1 | 5/2006 | He |
| 2006/0143180 A1 | 6/2006 | Peterson et al. |
| 2006/0144940 A1 | 7/2006 | Shannon et al. |
| 2007/0001006 A1 | 1/2007 | Schuessler et al. |
| 2007/0024449 A1 | 2/2007 | Bilyeu et al. |
| 2007/0203808 A1 | 8/2007 | Sekimoto et al. |
| 2008/0046263 A1 | 2/2008 | Sager et al. |
| 2008/0066167 A1 | 3/2008 | Andri |
| 2009/0014537 A1 | 1/2009 | Gelbman |
| 2009/0105866 A1 * | 4/2009 | Fontanot ............ G05B 19/4183 |
| | | 700/112 |
| 2009/0159666 A1 | 6/2009 | O'Brien et al. |
| 2009/0230190 A1 | 9/2009 | Chanez et al. |
| 2009/0323967 A1 | 12/2009 | Peirce et al. |
| 2010/0258641 A1 | 10/2010 | Yu |
| 2011/0154046 A1 | 6/2011 | Fradet et al. |
| 2011/0265428 A1 | 11/2011 | Schmitz |
| 2012/0102334 A1 | 4/2012 | O'Loughlin et al. |
| 2012/0130868 A1 | 5/2012 | Loken |
| 2012/0215918 A1 * | 8/2012 | Vasters .................. H04L 67/02 |
| | | 709/226 |
| 2012/0228388 A1 | 9/2012 | Kuo et al. |
| 2012/0254052 A1 | 10/2012 | Gao et al. |
| 2012/0284505 A1 | 11/2012 | Smith et al. |
| 2012/0310848 A1 | 12/2012 | Gao et al. |
| 2013/0004946 A1 | 1/2013 | Chesnut et al. |
| 2013/0099901 A1 | 4/2013 | Jones et al. |
| 2013/0169409 A1 | 7/2013 | Chang et al. |
| 2013/0226326 A1 | 8/2013 | Yoshida et al. |
| 2013/0283156 A1 | 10/2013 | Al Badrashiny et al. |
| 2013/0297929 A1 | 11/2013 | Chaves et al. |
| 2014/0025594 A1 | 1/2014 | Schmitz |
| 2014/0046852 A1 | 2/2014 | Chatelain et al. |
| 2014/0122479 A1 | 5/2014 | Panferov et al. |
| 2014/0173685 A1 | 6/2014 | Bittles et al. |
| 2014/0173688 A1 | 6/2014 | Fischer et al. |
| 2014/0189362 A1 | 7/2014 | Van Den Broeck et al. |
| 2014/0351601 A1 | 11/2014 | Jozwiak |
| 2014/0367464 A1 | 12/2014 | Herzig |
| 2015/0269559 A1 * | 9/2015 | Inotay ................ G06Q 20/3274 |
| | | 705/44 |
| 2015/0310386 A1 | 10/2015 | Fradet et al. |
| 2015/0317644 A1 | 11/2015 | Chanez et al. |
| 2015/0332210 A1 | 11/2015 | Niquille et al. |
| 2016/0027021 A1 | 1/2016 | Kerdemelidis |
| 2016/0072626 A1 | 3/2016 | Kouladjie |
| 2016/0299685 A1 | 10/2016 | Zhai et al. |
| 2016/0307153 A1 | 10/2016 | Loken et al. |
| 2017/0109549 A1 | 4/2017 | Fradet et al. |
| 2018/0131520 A1 | 5/2018 | Brockhaus et al. |

FOREIGN PATENT DOCUMENTS

| | | |
|---|---|---|
| CN | 102542215 | 7/2012 |
| EP | 1 645 992 A | 12/2006 |
| EP | 2104067 | 9/2009 |
| EP | 2172882 | 7/2010 |
| FR | 2 900 486 A | 11/2007 |
| GB | 2342743 | 4/2000 |
| JP | H-05151381 | 6/1993 |
| JP | H07-156459 A | 6/1995 |
| JP | H08-69247 A | 3/1996 |
| JP | A-2001-328711 | 11/2001 |
| JP | A-2002-7970 | 1/2002 |
| JP | 2003-104562 A | 4/2003 |
| JP | 2003208234 | 7/2003 |
| JP | 2003233794 | 8/2003 |
| JP | 2004320715 A | 11/2004 |
| JP | 2005-060080 A | 3/2005 |
| JP | 2005/115890 | 4/2005 |
| JP | A-2005-200187 | 7/2005 |
| JP | A-2005-263472 | 9/2005 |
| JP | 2005-316940 A | 11/2005 |
| JP | 2006229582 | 8/2006 |

(56) References Cited

FOREIGN PATENT DOCUMENTS

| JP | 2007-018355 A | 1/2007 |
|---|---|---|
| JP | 2007-528830 A | 10/2007 |
| JP | 2008-515741 A | 5/2008 |
| JP | 2009-151668 | 7/2009 |
| KR | 100911762 B1 | 8/2009 |
| RU | 2199781 C1 | 2/2003 |
| RU | 2216776 C2 | 11/2003 |
| RU | 2225641 C2 | 3/2004 |
| WO | WO-02/073551 A1 | 9/2002 |
| WO | WO-2005/083644 A | 9/2005 |
| WO | WO-2006/038114 A1 | 4/2006 |
| WO | WO-2010/063909 | 6/2010 |
| WO | WO-2014/122479 | 8/2014 |

OTHER PUBLICATIONS

"Best Compression algorithm for a sequence of integers", Nov. 12, 2008, Stack Overflow. (XP-002697996).

"Databases—No longer fit for purpose for Serialisation and Track & Trace", 2012.

Extended European Search Report in 15152959.1, dated Oct. 7, 2015, 4 pages.

PCT Written Opinion of the International Searching Authority in PCT/EP2016/051853, dated Nov. 4, 2016, 11 pages.

Extended European Search Report in 15153386.6, dated Oct. 16, 2015, 7 pages.

PCT Written Opinion of the International Searching Authority in PCT/EP2016/052008, dated Jan. 31, 2015, 10 pages.

PCT International Search Report in PCT/EP2016/072453, dated Dec. 5, 2016.

PCT International Search Report in PCT/EP2016/069316, dated Oct. 26, 2016.

PCT International Search Report in PCT/EP2016/070138, dated Dec. 7, 2016.

PCT International Search Report in PCT/EP2016/070137, dated Nov. 14, 2016.

Dodge et al., Codes of Life: Identification Codes and the Machine-Readable World, Dec. 2005, Environment and Planning D: Society and Space, vol. 23, pp. 851-881 (Year: 2005).

China National Intellectual Property Administration Search Report for Application No. 201580033643.9, 2 pages, dated Jul. 25, 2019.

In Japanese Patent Application No. 2017-540271, Notice of Reasons for Refusal, dated Nov. 28, 2019, 4 pgs.

* cited by examiner

MULTIPLE AUTHORIZATION MODULES FOR SECURE PRODUCTION AND VERIFICATION

This application is the National Stage of International Application No. PCT/EP2016/070137, filed Aug. 25, 2016, which claims the benefit of U.S. Provisional Application Ser. No. 62/209,342 filed Aug. 25, 2015, the contents which are herein incorporated by reference in its entireties.

The present invention relates generally to techniques for marking products with secure identification codes and verifying of those codes, and more particularly to systems and methods for obtaining the authorization to generate the secure product identifiers. Existing methods for authenticating a secure product identifier or set of configuration instructions typically involve communicating with a single verification server. There exists a need for an improved method and apparatus for rapidly and securely authenticating a secure product identifier or set of configuration instructions in a distributed or complex environment. This invention addresses these shortcomings.

Maintaining track of where and how a production run is authorized or executed may be important, especially for audit and recall purposes. The invention relates to a system of obtaining authorization using multiple authorization modules and maintaining a method of determining where a specific authorization was provided. This invention provides for a method of identifying which component, or components provided an authorization. When an authorization is provided by a module, it is combined with a security token that can be a digital signature, specific encryption method, such as a hash of the module's identification number, or other information identifying which module provided the authorization. To obtain a full authorization, multiple authorization modules may be required and these modules can be connected in parallel and or in series with each other.

The following embodiments of the invention are exemplary and are not intended to be limiting of the scope of the invention. While one or more embodiments of the present invention have been described, various alterations, additions, permutations and equivalents thereof are included within the scope of the invention. In the following description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps below may be presented in a certain order, in some cases the ordering may be changed so that certain inputs are provided at different times or in a different order without changing the function of the systems and methods described. Various computations that are described below, such as those within the code initialization, generation, and authentication procedures, need not be performed in the order disclosed, and other embodiments using alternative orderings of the computations could be readily implemented. In addition to being reordered, the computations could also be decomposed into sub-computations with the same results.

Embodiments of the invention will now be described, by way of example, with reference to the accompanying drawings, in which.

Figure 1:
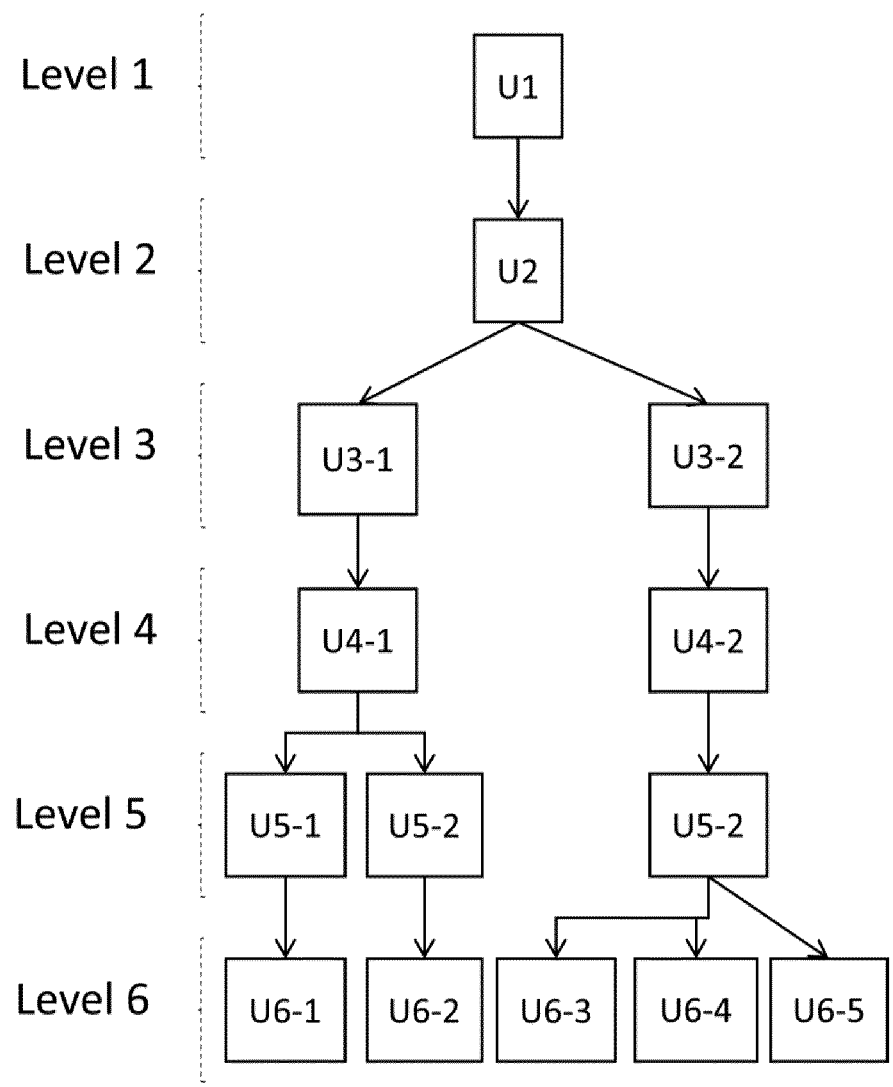
FIG. 1 illustrates an example multiple authorization configuration.

According to an embodiment of the invention for authenticating a production of products, the method includes electronically storing configuration data for a production run, wherein the configuration data for the production run specifies parameters used in the production of products; receiving a request for authorization at an authorization module; forwarding the request for authorization to one or more downstream authorization modules; at a downstream authorization module, determining if the configuration data for the production run is authorized; at the downstream authorization module, if the production run is authorized: generating a set of security tokens and associating one or more of the security tokens with the configuration data; digitally signing the configuration data by generating a digital signature and associating the digital signature with the configuration data; transmitting the digitally signed configuration data and the digital signatures and the one or more security tokens to the upstream authorization module where the request for authorization was received from; receiving the digitally signed configuration data and the one or more security tokens at a production machine; at the production machine, verifying the digitally signed configuration data; calculating a set of secure product identifiers based on the digitally signed configuration data and the one or more security tokens; producing products in a production run according to the digitally signed configuration data; and applying the set of secure product identifiers on the products according to the digitally signed configuration data.

According to an alternative or additional embodiment, a receiving authorization module is able to authenticate a production of products based on the configuration data received wherein the production would be authorized by any of one or more downstream authorization modules. According to an alternative or additional embodiment, the method further comprises forwarding the request for authorization from a first downstream authorization module to one or more authorization modules downstream of the first downstream authorization module.

According to an alternative or additional embodiment, a receiving authorization module determines if a production run is authorized and further configuration data exists that the receiving authorization module was not able to decipher and there are one or more downstream authorization modules to the receiving authorization module, and the receiving authorization module either: a) forwards the request for authorization to a downstream authorization module without associating a security token with the authorization prior to forwarding; or b) digitally signs the configuration data by generating a set of one or more security tokens and associating said one or more security tokens with the configuration data deciphered and authorized by the receiving authorization module and forwarding the request for authorization to one or more downstream connected authorization modules to determine if the run is authorized.

According to an alternative or additional embodiment, a receiving authorization module receives an authorization from a downstream authorization module, digitally signing the configuration data by generating a set of one or more security tokens and associating the one or more security tokens with the configuration data authorized by the authorization received from the one or more downstream authorization module and transmitting the digitally signed configuration data and the one or more security tokens to an upstream module from which the request was originally received by the receiving authorization module prior to it being passed to a downstream authorization module for the first time.

According to an alternative or additional embodiment, authorization modules are connected in parallel, forwarding the request from an upstream module to the downstream parallel authorization modules to obtain an authorization.

According to an alternative or additional embodiment, a hardware security module which if tampered with, will destroy the information stored within it, to include encryption and decryption keys, stored security tokens and authorizations.

According to an alternative or additional embodiment, the digital signature is used as a security token.

According to an alternative or additional embodiment, a method for verifying an authorization or a product comprises: receiving a verification request at a verification module; the verification module extracting one or more of configuration data from the received verification request, one or more security tokens and one or more digital signatures; forwarding the extracted configuration data to an authorization module; said authorization module determining if the configuration data for the production run is authorized based on the extracted configuration data received by the authorization module; wherein the production is not authorized, returning a negative authorization; wherein the production run is authorized: wherein previously generated security tokens and digital signatures are stored, returning a positive authorization to the verification module and the verification module retrieving, as retrieved security tokens and digital signature, the previously generated security tokens associated with the generated positive authorization based on the extracted configuration data from one or more databases where security tokens and digital signatures are stored; wherein previously generated security tokens and digital signatures are not stored, the authorization module generating a set of security tokens and a digitally signature and returning the generated security token and digital signature to the module from which the request was received as a retrieved security tokens and digital signature; the verification module comparing the retrieved one or more security tokens and digital signatures to the one or more security tokens and digital extracted from the verification request; wherein the extracted one or more security tokens and digital signature match the retrieved one or more security tokens and digital signature, returning a positive verification, otherwise returning a negative verification.

According to an alternative or additional embodiment, a receiving authorization module is capable of verifying any authorization that was previously authorized by any authorization module that is downstream of said receiving authorization module.

According to an alternative or additional embodiment, a full authorization cannot be generated by a receiving authorization module, and forwarding the request for verification from said authorization module to one or more downstream authorization modules as a verification request.

According to an alternative or additional embodiment, the method further comprises receiving a returned verification request at an upstream authorization module, the returned verification request containing a positive verification, executing a verification request on the returned verification request to further verify the request and returning a verification answer to the module from which the request was originally received from based on the outcome of the verification executed at the upstream authorization module.

FIG. 1 illustrates serial and parallel connections and upstream and downstream relationships of authorization modules, according to one example embodiment. The arrows point downstream, however, it is understood that information can travel in both directions, upstream and downstream, through these illustrative connections. FIG. 1. illustrates example embodiments of the invention and are not intended to be limiting of the scope of the invention. Various additional system modules capable of interfacing with the authorization modules are described below. Any of the modules can be co-located physically, or located remotely from each other. Additionally, any of the modules could be logically or physically combined into a single module without departing from the scope of the invention.

Integration with Secure Production Systems

As used herein, an entity may refer to: i) a person, such as a consumer of a product; ii) a group, such as a group having a common interest, such as retailers; iii) a computing device; iv) a computing node in a networked system; v) a storage location, such as a memory storage unit storing a document; vi) a virtual point in a network, such as representing a business function within a business enterprise, and the like. Additionally, an entity may represent a point in a workflow, such as for authorization, which may be performed by a person responsible for that aspect of the workflow or a computing device which provides automated processing. The term entity is not meant to be limited to any one of these examples and may extend to other situations consistent with the concepts described herein.

Control Module

Figure 2:
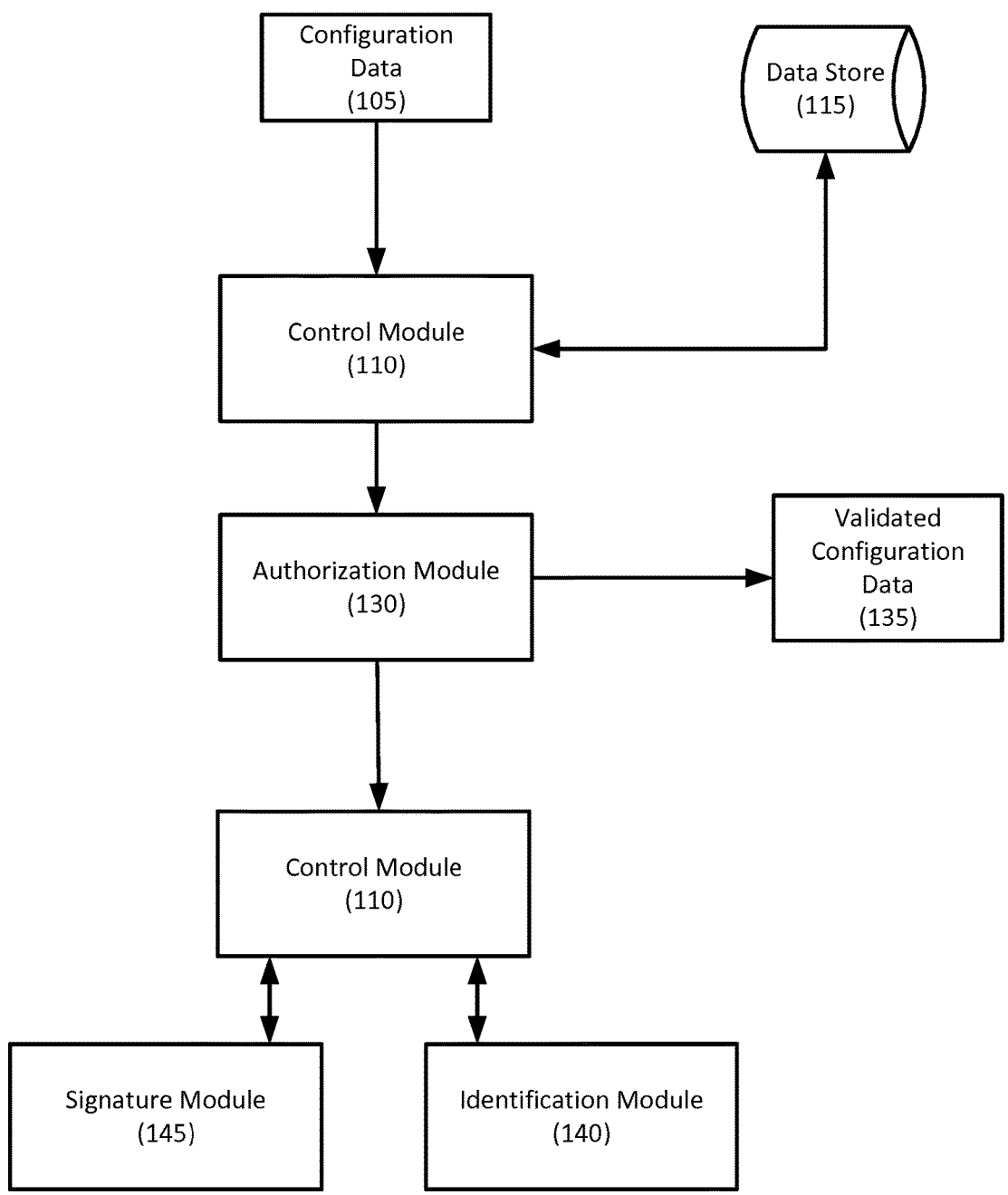
FIG. 2 illustrates an example method for code initialization.

With reference to FIG. 2, the Control Module (also known as the "Orchestrator") (110) can receive input from any of the other modules or outside sources and can provide instructions to the other modules in the system based on pre-configured programs and/or the operator inputs to it. It can also generate a dashboard summary of the system status.

Input to the Control Module can include any or all configuration data (105). The supplied configuration data can indicate any or all of the parameters including, but not limited to, machine for production, production line, factory, product to be produced, and volume of product. The configuration data may indicate what items (for example, products) are to be marked with the secure identifiers and how those items may be produced. The configuration data may indicate a range of products, such as starting and ending product identifiers. In some embodiments, the range can be a set of product identifiers. The configuration data may be provided by an operator of the system or be dynamically or automatically generated. The configuration data can include further executable instructions or an interpretable algorithm. The configuration data may be based on operator input or the output of a manufacturing execution system, or other centralized system for instructing how and what to produce.

The Control Module (110) can transmit the configuration data to any module, including but not limited to the Authorization Module (130), the Identification Module (140), and the Signature Module (145).

The Control Module can request authorization from the Authorization Module to execute a production operation. This process involves transmitting a request (including some or all of the configuration data) to the Authorization Module and receiving signed or encrypted configuration data. In some embodiments, the Authorization Module can return the configuration data to the Control Module, including a digital signature applied to that configuration data. The Authorization Module determines whether to authorize the request from the Control Module based on the data it receives. In addition, the information returned by the Authorization Module included in the Configuration data can be used to bound the codes generated with the authorization provided. As the data is signed by the Authorization Module, the system can be prevented from modifying the configuration data. As a non-limiting example, a modification of a request to produce one brand on in place of another may be controlled, allowed, or denied.

Authorizations received from the Authorization Module can also be transmitted to the Verification Module so that verification requests can be subsequently processed against those authorizations. The data transmitted to the Verification Module can include a secure identifier, as well as any of the configuration data. In some examples, the configuration data sent to the Authorization Module can include product range information.

The signed or validated configuration data can be the some or all of the set of input parameters of the Control Module, verified and validated by the Authorization Module, which remains in force during a production. A security token can be an output from the Authorization Module and/or an input parameter of the Control Module. The security token can be a proof that the product identifier corresponds to validated configuration data and therefore to an authorized production. The security token can be an input to the Signature Module to generate a signature for a single product identifier, or the signature of a single product identifier, or a product identifier itself, or a range of products or product identifiers. The security token can be a unique code, a random code, or a pseudo-random code. The security token can be any numerical, or alphabetic, or combination of numeric and alphabetic characters.

Authorization Module

The Authorization Module operates to validate requests for authorization to take an action in the identification system. In some embodiments, it can operate as a license manager.

The Authorization Module can receive the configuration data. The Authorization Module can also receive range and/or algorithm information. In some embodiments, the Authorization Module can receive input configuration data from the Control Module. The output range can optionally identify a range of products, machines, factories, ranges, or product volumes that are authorized. The output can also include range information and/or include an algorithm which comprises a set of executable or interpretable instructions that will be used to generate the security token. The Authorization Module can be centralized at the factory level or be decentralized on each production line, or a combination of both.

The Authorization Module can store and/or generate one or more encryption keys. In some embodiments, the key stored by the Authorization Module can be a private public encryption key according to a public key infrastructure (PKI). In some embodiments, the Authorization Module stores the only copy of the private key. In other embodiments, the Authorization Module is distributed across several instances which replicate the keys between them. In the case of PKI, the Authorization Module can output signed configuration data. In some embodiments, the Authorization Module can encrypt the configuration data and/or sign the configuration data output.

In some embodiments, the system is configured so that only the Authorization Module can read the secured input parameters of the Control Module, required for the generation of the security token. In some embodiments, the key is provided to the Authorization Module from another source.

The Authorization Module can be embodied as a hardware security module (HSM), or another type of physical computing device that safeguards and manages digital keys for strong authentication and providing cryptoprocessing. The Authorization Module functionality can be performed by a computer with an embedded board with an encryption key or PKI private key. The module can be equipped with features such that attempts to access the data will result in it being rendered unreadable or inaccessible.

If the input to the Authorization Module is a range and an algorithm, the Authorization Module can output an identity in the range of authorization and a security token of the identifier. For example, the output identity can be a range from 0 to 1,000 with a security token for each item in the range.

The Authorization Module can generate a key from any parameter used in the Control Module. In some embodiments, the Authorization Module may generate or derive a key from an existing key from any parameter used in the Control Module such that only a specific Authorization Module can use this key. The equipment and software implementing this public key technique can be embodied in an asymmetric cryptosystem.

The output of the Authorization Module can be information, such as the configuration data and, optionally, one or more security tokens, with a digital signature provided by the Signature Module. Alternatively, the output of the Authorization Module can be the configuration data encrypted to a key held by the Authorization Module. The output of the Authorization Module can be provided to the Control Module.

According to an embodiment, the method for authenticating a production of products includes electronically storing configuration data for a production run, wherein the configuration data for the production run specifies parameters used in the production of products; determining if the configuration data for the production run is authorized; if the production run is authorized: generating a security token and associating the token with the configuration data; and digitally signing the configuration data by generating a digital signature and associating the digital signature with the configuration data; receiving the digitally signed configuration data and the digital signature at a production machine; at the production machine, verifying the digital signature associated with the digitally signed configuration data; calculating a set of secure product identifiers based on the digitally signed configuration data; producing products in a production run according to the digitally signed configuration data; and printing the set of secure product identifiers on the products according to the digitally signed configuration data.

In an alternative or additional embodiment, the configuration data represents a range of products to be produced. In an alternative or additional embodiment, the configuration data represents a range of products, machines, factories, ranges, or product volumes that are authorized. Alternative or additional embodiments can include receiving a verification request, the request comprising a product identifier and determining if the configuration data for the production run is authorized by reference to a license manager. Alternative or additional embodiments can include generating a security token for a range of products; and associating the security token with the range of products.

With reference to FIG. 1, the Authorization Modules can exist in a serial or parallel or combination relationships as to one or more Control Modules. In a serial relationship, an authorization request containing configuration data is sent from a Control Module to a first Authorization Module. If this module is able to decipher the configuration data and return a proper authorization, it will do so and works as a system with a single Authorization Module in this aspect. However, if it is not, then it forwards the full authorization request to a second Authorization Module which attempts to decipher and return a proper authorization. If it is able to do so, it returns the authorization to the Authorization Module from which it received the request which in turn returns it to the Control Module. Because each Authorization module can have a unique key, identifier, digital signature, security token or encryption method, the system can keep track of which Authorization Module provided the Authorization. In this manner, multiple Authorization Modules can be linked. The last Authorization Module in the series, if it is unable to return an authorization, works the same as an Authorization Module in a single Authorization system, and this response is passed back by each Authorization Module to the Control Module.

In an alternative or additional embodiment, a part of an authorization request can be deciphered by an Authorization Module. In this embodiment the Authorization Module may be able to decipher part of the authorization and execute certain algorithms contained within it or decipher an embedded authorization request within the original which it cannot decipher. In either of these cases, or any other in which an Authorization Module is unable to fully decipher an authorization request and return an authorization, it can then pass some or all of the remaining authorization request and configuration data to the next Authorization Module in the series, which can continue to attempt to decipher the remainder of the authorization data to return an authorization. This can again be repetitive through the series until an authorization is gained. Each Authorization Module would again provide its own security token digital signature to the data it was able to decipher and passes this data back up the stream of Authorization Modules. Further in this embodiment, each Authorization Module digitally signs or encrypts the data it deciphered, or alternatively, each Authorization Module digitally signs or encrypts all data it deciphers as well as all data it receives from downstream Authorization Modules as well and then continue to pass these authorizations upstream to the Control Module.

In another series embodiment of the invention, the authorization request is passed from the Control Module to the last Authorization Module in the series of Authorization Modules prior to it that module attempting to decipher and return an authorization. If it can, then the authorization is passed straight up to the Control Module, unless the authorization contains an algorithm that directs other actions.

In an embodiment in which the Authorization Modules exist in a parallel relationship, an authorization request is sent to all of the Authorization Module which exist in parallel to each other in the first link to the Control Module. Each of these would attempt to decipher the message. In one embodiment, the first to decipher the message returns an authorization to the Control Module and the Control Module ignores all other authorizations it receives for that request. The Control Module can send a cancel request to the Authorization Modules to stop any further work the Authorization Modules may be doing on the Authorization, such as if the system contains series components which are continuing to work on the request.

Alternatively, the Control Module can receive all authorizations and work with each authorization it receives. It can also be set to only receive a certain number, such as the first three authorizations, and then ignore later received authorization requests or send a termination signal to the Authorization Modules to discontinue attempting to decipher the authorization request. In this embodiment, the Authorization Modules that are connected in parallel can then be connected in series to one or more Authorization Modules, each of which also can be connected in parallel or series.

The connections between Authorization Modules can be a physical connection or a logical connection. A logical connection exists if two units are contained, for example, within the same computing device, but there is an upstream/downstream relationship such that authorization requests go to one authorization module prior to being forwarded to the second module. A unit that receives an authorization request is considered downstream from the module, be it the Control Module or another Authorization Module, from which the authorization request was received, such as illustrated in FIG. 1. The module which sends a request is considered upstream from any module which receives the request. Similarly, a unit which receives an authorization, or a non-authorization, from a unit which has attempted to decipher an authorization request, is upstream of the unit from which it receives it from.

Units in parallel are considered on the same level, and are similarly considered downstream of a unit from which they receive an authorization request. They are upstream only to the unit from which they receive messages that are downstream of them, as illustrated in FIG. 1. References to sending upstream or downstream, may be understood to only send it one level further in the said direction. Additionally, even if two units are on the same level, if they are not laterally connected, they will not be considered in parallel. An upstream unit may send an authorization request to only one downstream authorization module even though it is connected to multiple downstream modules. In this case it is considered a series connection. An example of this is shown between levels 2 and 3 of FIG. 1. This connection, if the request is sent to both/all level 2 units is then considered a parallel connection. The example of the connections between levels 4 and 5 demonstrates a parallel only connection. FIG. 1 can be part of a larger system such that Level 1 of FIG. 1 is the n-th level, and additional levels can continue from any of the levels or Authorization Modules. Level 1 can be an Authorization Module if it is contained within a larger unit, or it can be a Control Module if it is the most upstream module. The labeling is of units is only exemplary.

With respect to FIG. 1, connection between Levels 2 and 3 may be parallel or serial. If requests are only to U3-1 or U3-2 it is series, if sent to both, then parallel. Connection between levels 4 and 5 represents a parallel only connection. Connections from U5-2 represents a parallel and series connection. U6-5 can be in series with U5-2 but U6-3 and U6-4 are in parallel only with U5-2. U6-5 can be in parallel if requests are sent to all Modules U6-3, U6-4 and U6-5.

In any of the above embodiments, an Authorization Module can pass the request it receives and rejection or authorization and any accompanying information, such as algorithms or security tokens to a Verification Module which can store this information. As such, the Authorization Module does not store any of the information and there is a record for later auditing or troubleshooting if any problems or questions arise to authenticity, hacking or counterfeit codes, counterfeit products or tampering with any part of the system.

Signature Module

Figure 3:
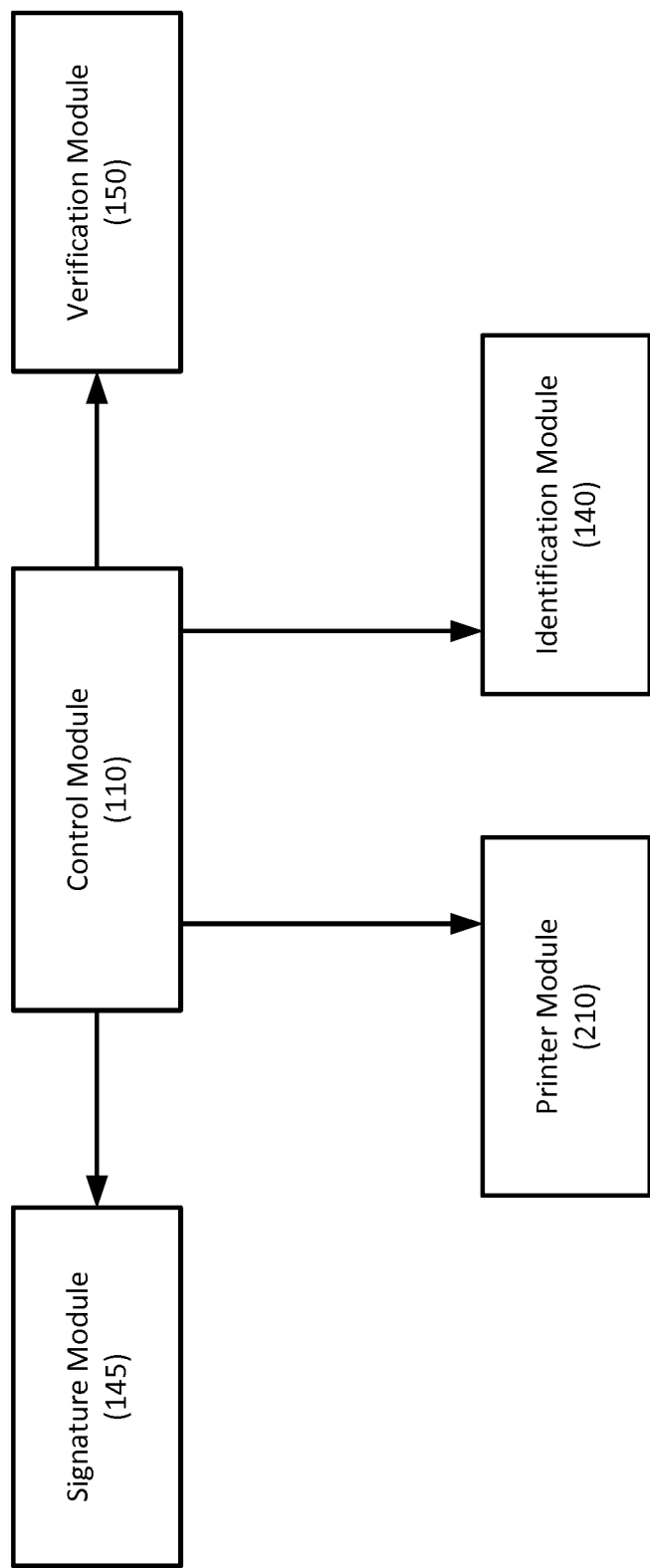
FIG. 3 illustrates an example method for code generation.
Figure 4:
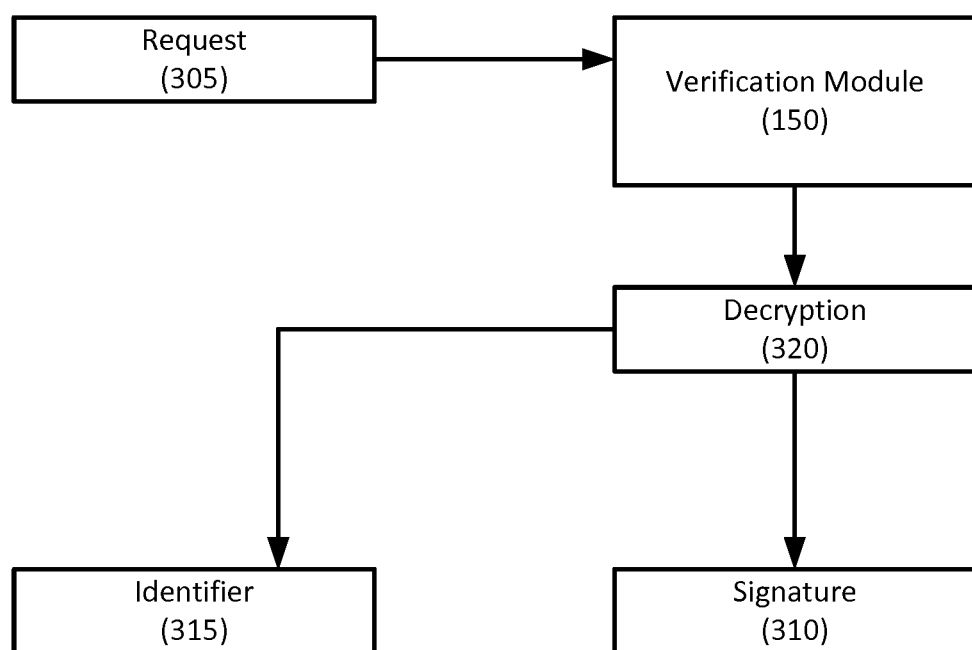
FIG. 4 illustrates an example method for code authorization.

With reference to FIGS. 2-4, the Signature Module can receive the configuration data, an authorization key, a security token or any combination of them, as well as a unique product identifier generated by the Identification Module. In some embodiments, the Signature Module may receive, in addition, one or more intrinsic machine and/or product characteristics, and/or product item characteristics. The Signature Module can create a digital signature based on any or all of those inputs, generally referred to herein as configuration data.

To generate the digital signature, in some embodiments, the Signature Module can first generate a digest or other representation of the configuration data. In some embodiments, the digest can be generated by calculating a cryptographic hash value of the configuration data according to a digital signature algorithm provided by the Signature Module executing the digital signature algorithm. As non-limiting examples, the hash may be calculated according to MD5, SHA-1, SHA-2, SHA-3/Keccak functions. The digest can then be encrypted using a private key obtained by the Signature Module to generate the digital signature.

In some embodiments, a digital signature may use a Public Key Infrastructure (PKI) technology to establish authenticity of configuration data. PKI systems use certificates and keys to identify entities, individuals, or organizations. The Authentication Module uses a private key to sign the configuration data and associates the configuration data with a certificate including the public key used by the Authentication Module.

A recipient module uses a public key to verify the digital signature and, thereby, the authenticity of the signed configuration data. Supporting technologies can be employed to establish other non-repudiation features, such as the time of signing and the status of the signing keys. The public key may be provided to the recipient entity directly, or by publication in an on-line repository or directory.

Identification Module

The Identification Module can receive the configuration data and generate identifiers for items to be marked. The Identification Module can receive a digital signature generated by the Signature Module that will be combined with the unique identifier to generate a compound unique identifier.

The identifiers can include, or be based on, the date and/or time of production of a product to be marked and the digital signature received from the Signature Module. In some embodiments, the secure identifiers generated can be unique or substantially unique. In some embodiments, the secure identifiers can be the security token.

In the case of ranges, the Identification Module can generate a range identifier and a set of identifiers within the generated range.

The identifiers created may be output to a print control module for direct printing on to a product or may be input to further processing to generate another code that is printed on product packaging.

Verification Module

With reference to FIG. 4, the Verification Module (150) can receive the verified configuration data and, based on that validated configuration data, validate a request for authorization (305) for a factory, machine, product, or production volume reported. The inputs to the Verification Module can include any or all of the verified configuration data, output from the signature module, identifiers, security tokens, and/or range information. The Verification Module can generate information for an Authorization Module with these parameters in order to verify/validate a product identifier.

The Verification Module can generate a decryption (320) of the request, which includes one or more identifiers or ranges of identifiers (315) and signature data (310) including one or more security tokens.

If a security token is input to the Verification Module, the Verification Module can return information relating to the authorization, the configuration data, and/or ranges. If a single security token is used for a range of products, the security token can be provided to the Verification Module to verify parameters associated with the range of products, rather than individual products. This embodiment may be particularly useful in the context of export regulation.

System Processes

Identification Code Initialization

Identification Code Initialization can be performed to validate the authorization and the parameters. In some embodiments, for performance reasons, this can be performed once at the beginning of the production. With reference to FIG. 2, the Control Module (110) can access a data store (115) for additional parameters, or additional parameters can be provided to the module. The parameters and the configuration data, once signed by the Authorization Module (130), form the validated configuration data (135). The Control Module receives verified configuration data as described above, in response to its request to the Authorization Module (130).

The authorization can be an authorization to produce a product, or to mark a product with a certain ID, or both. The configuration data and the additional parameters are transmitted to the Authorization Module and are used by the Authorization Module to generate the security token. The Authorization Module can sign the configuration data and the additional parameters, forming the signed configuration data. As discussed above, the configuration data can specify a certain production run or other products and activities. The Authorization Module can generate an authorization block including a key, authorized identifiers, and security token. In some embodiments, the key may be generated by the Authorization Module, or may be provided to it. The Authorization Module can transmit the authorization block to the Control Module. The Control Module can transmit the validated configuration data and other information, such as a list of identifiers, a range of identifiers, and/or one or more security tokens, to the Signature Module (145). The Signature Module can sign the data and send the signed data and the signature to the Control Module. The Identification Module (140) can then receive from the Control Module an initialization block including the identifiers and/or ranges of identifiers for products.

An embodiment of the invention can include a method for initializing a process for securely controlling a production facility, comprising: electronically receiving configuration data from an electronic data store; electronically storing the configuration data for a production run, wherein the configuration data for the production run specifies parameters used in the production of products; transmitting the configuration data to an authorization module; at the authorization module: determining whether the production run is authorized; generating validated configuration data comprising a key, a representation of a plurality of authorized product identifiers, and a security token; transmitting the validated configuration data to a signature module; and at the signature module, signing the validated configuration data.

Alternative or additional embodiments can include determining if the configuration data for the production run is authorized; if the production run is authorized: generating a security token and associating the token with the configuration data; and digitally signing the configuration data by generating a digital signature and associating the digital signature with the configuration data.

Alternative or additional embodiments can include receiving the digitally signed configuration data and the digital signature at a production machine; at the production machine, verifying the digital signature associated with the digitally signed configuration data; and calculating a set of secure product identifiers based on the digitally signed configuration data.

Alternative or additional embodiments can include producing products in a production run according to the digitally signed configuration data; and printing the set of secure product identifiers on the products according to the digitally signed configuration data.

Alternative or additional embodiments can include determining whether the production run is authorized further comprises retrieving licensing data from a licensing server.

Identification Code Generation

With reference to FIG. 3 the Code Generation process generates the codes during the production process. The identification code generation process can begin with a request to the Identification Module (140) for an identifier or a range of identifiers, which are then returned to the Control Module (110). The identifiers are then sent to the Signature Module (145), which signs the identifiers and returns the signed identifiers to the Control Module. The Signature Module can receive a security token. In some embodiments, the Signature Module does not need to be controlled by external instructions and if any identification code is to be counted, the code can be linked to a single security token. The Signature Module can be controlled by the Authorization Module. The Control Module can then send the output data to print control in Printer Module (210). The output data sent to the print control may be encrypted before transmission. The configuration data, can be transmitted to the Verification Module (150) for the handling of subsequent verification requests.

An embodiment of the invention includes a method for generating a code for securely identifying products produced at a production facility, including electronically receiving configuration data from an electronic data store; electronically storing the configuration data for a production run, wherein the configuration data for the production run specifies parameters used in the production of products; transmitting the configuration data to an authorization module; at the authorization module: determining whether the production run is authorized; generating validated configuration data comprising a key, a representation of a plurality of authorized product identifiers, and a security token; transmitting the validated configuration data to a signature module; at the signature module, signing the validated configuration data; at an identification module, receiving a request for a product identifier and generating a product identifier in response to the request; transmitting the product identifier from the identification module to a signature module; digitally signing the product identifier at the signature module; and transmitting the digitally signed product identifier to a printer module.

Alternative or additional embodiments can include electronically receiving configuration data from an electronic data store; electronically storing the configuration data for a production run, wherein the configuration data for the production run specifies parameters used in the production of products; transmitting the configuration data to an authorization module; at an authorization module: determining whether the production run is authorized; generating validated configuration data comprising a key, a representation of a plurality of authorized product identifiers, and a security token; transmitting the validated configuration data to a signature module; at the signature module, signing the validated configuration data.

In alternative or additional embodiments, the request is for a range of identifiers. Alternative or additional embodiments can include determining if the configuration data for the production run is authorized; if the production run is authorized: generating a security token and associating the token with the configuration data; and digitally signing the configuration data by generating a digital signature and associating the digital signature with the configuration data.

Verification of Identification Code

As described above, the Verification Module (considered here in the singular as the serial or parallel relationships of multiple logical or physical Verification Modules) can receive a request for verification. The request can include one or more identification codes. The verification module can decrypt or otherwise deobfuscate the identifier code received. The resulting information, having been decrypted, can include a signature component and an identifier. The resulting identifier can then be linked against the original configuration data previously stored in association with the identifier. The linked data can include other identifiers in a range, a security token, and other information stored in connection with the production of the product bearing that identification code.

Some embodiments can include additional functionality for processing identifiers that are provided to the Verification Module based on the party requesting the verification of the code. Different parties can be provided with different means to access the Verification Module. For example, a retailer or other form of merchant, may be provided with a different portal or communication channel than a consumer. The retailer may also be required to authenticate itself to the Verification Module.

In some embodiments, the system can be configured so that a verification by a consumer results in an identifier being marked as having been verified. The system can be further configured to store those codes for which verification is requested by a consumer. Any subsequent requests for verification of those already-verified codes can be denied or otherwise processed differentially.

Export Functions

Embodiments of the invention can be applied in the context of code export to third-parties. Those embodiments can include an export function configured to generate a separate code for this purpose. The exported code can be generated by collecting one or more product identifiers and/or security tokens, and signing those identifiers and/or tokens. The identifiers and/or tokens can be collected at any point in the production process. The signed identifiers and/or tokens in the form of exported codes can be provided to a third party who can store them and perform verification of the validity of the identifiers and/or tokens.

System Architectures

The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions. In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as a CRT (cathode ray tube), LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™, C++, C, C#, Visual Basic™, JavaScript™, PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

While one or more embodiments of the invention have been described, various alterations, additions, permutations and equivalents thereof are included within the scope of the invention.

What is claimed is:

1. A method for authenticating a production of products, comprising:
   electronically storing configuration data for a production run, wherein the configuration data for the production run specifies parameters used in the production of products;
   receiving a request for authorization at an upstream authorization module, the authorization module configured to comprise a hardware security module which, if tampered with, will destroy the information stored within it;
   forwarding the request for authorization to one or more downstream authorization modules;
   at a downstream authorization module, determining if the configuration data for the production run is authorized;
   at the downstream authorization module, if the production run is authorized:
     generating a set of security tokens and associating one or more of the security tokens with the configuration data;
     digitally signing the configuration data by generating a digital signature and associating the digital signature with the configuration data;

transmitting the digitally signed configuration data and the digital signature and the one or more security tokens to an upstream receiving authorization module where the request for authorization was received from;

receiving the digitally signed configuration data and the one or more security tokens at a production machine;

at the production machine, verifying the digitally signed configuration data;

calculating a set of secure product identifiers based on the digitally signed configuration data and the one or more security tokens;

producing products in a production run according to the digitally signed configuration data; and applying the set of secure product identifiers on the products according to the digitally signed configuration data.

2. The method of claim 1, wherein a receiving authorization module is able to authenticate a production of products based on the configuration data received wherein the production would be authorized by any of one or more downstream authorization modules.

3. The method of claim 1, further comprising forwarding the request for authorization from a first downstream authorization module to one or more authorization modules downstream of the first downstream authorization module.

4. The method of claim 1, wherein a receiving authorization module determines if a production run is authorized and further configuration data exists that the receiving authorization module was not able to decipher and there are one or more downstream authorization modules to the receiving authorization module, and the receiving authorization module either:
  a. forwards the request for authorization to a downstream authorization module without associating a security token with the authorization prior to forwarding; or
  b. digitally signs the configuration data by generating a set of one or more security tokens and associating said one or more security tokens with the configuration data deciphered and authorized by the receiving authorization module and forwarding the request for authorization to one or more downstream connected authorization modules to determine if the run is authorized.

5. The method of claim 1, wherein a receiving authorization module receives an authorization from a downstream authorization module, digitally signing the configuration data by generating a set of one or more security tokens and associating the one or more security tokens with the configuration data authorized by the authorization received from the one or more downstream authorization module and transmitting the digitally signed configuration data and the one or more security tokens to an upstream module from which the request was originally received by the receiving authorization module prior to it being passed to a downstream authorization module for the first time.

6. The method of claim 1, wherein authorization modules are connected in parallel, forwarding the request from an upstream module to the downstream parallel authorization modules to obtain an authorization.

7. The method of claim 1, wherein the hardware security module further stores encryption and decryption keys, stored security tokens and authorizations.

8. The method of claim 1, wherein the digital signature is used as a security token.

9. The method of claim 1, wherein:
when the upstream receiving authorization module is able to decipher part of an authorization request but is unable to fully decipher the remainder of the authorization request to return an authorization, the upstream receiving authorization module passes some or all of the remaining authorization request and configuration data to a downstream authorization module; and wherein determining if the configuration data for the production run is authorized is performed by attempting to decipher the remaining authorization request.

10. The method of claim 1, wherein each authorization module digitally signs or encrypts the data it deciphered, or alternatively, each authorization module digitally signs or encrypts all data it deciphers as well as all data it receives from downstream authorization modules as well and then continue to pass these authorizations upstream to the control module.

11. The method of claim 9, wherein the upstream receiving authorization module determines if a production run is authorized and if further configuration data exists that the upstream receiving authorization module was not able to decipher and if there are one or more downstream authorization modules to the receiving authorization module, and the upstream receiving authorization module either:
  a. forwards the request for authorization to a downstream authorization module without associating a security token with the authorization prior to forwarding; or
  b. digitally signs the configuration data by generating a set of one or more security tokens and associating said one or more security tokens with the configuration data deciphered and authorized by the receiving authorization module and forwarding the request for authorization to one or more downstream connected authorization modules to determine if the run is authorized.

12. The method of claim 3, wherein when the first downstream authorization module determines if a production run is authorized and is able to decipher part of an authorization request but determines that further configuration data exists that the first downstream authorization module was not able to decipher, and if there are one or more further downstream authorization modules, downstream to the first downstream authorization module, the first downstream authorization module either:
  a. forwards the request for authorization to a further downstream authorization module without associating a security token with the authorization prior to forwarding; or
  b. digitally signs the configuration data by generating a set of one or more security tokens and associating said one or more security tokens with the configuration data deciphered and authorized by the first downstream authorization module and forwarding the request for authorization to one or more further downstream connected authorization modules to determine if the run is authorized.

13. A method for verifying an authorization or a product, comprising:
receiving a verification request at a verification module;
  the verification module extracting one or more of configuration data from the received verification request, one or more security tokens and one or more digital signatures;
  forwarding the extracted configuration data to an authorization module; said authorization module determining if the configuration data for a production run is authorized based on the extracted configuration data received by the authorization module;
    wherein the production is not authorized, returning a negative authorization;

wherein the production run is authorized:
wherein previously generated security tokens and digital signatures are stored, returning a positive authorization to the verification module and the verification module retrieving, as retrieved security tokens and digital signature, the previously generated security tokens associated with the generated positive authorization based on the extracted configuration data from one or more databases where security tokens and digital signatures are stored;
wherein previously generated security tokens and digital signatures are not stored, the authorization module generating a set of security tokens and a digitally signature and returning the generated security token and digital signature to a module from which the request was received as a retrieved security tokens and digital signature;
the verification module comparing the retrieved one or more security tokens and digital signatures to the one or more security tokens and digital signature extracted from the verification request; wherein the extracted one or more security tokens and digital signature match the retrieved one or more security tokens and digital signature, returning a positive verification, otherwise returning a negative verification.

14. The method of claim 13, wherein a receiving authorization module is capable of verifying any authorization that was previously authorized by any authorization module that is downstream of said receiving authorization module.

15. The method of claim 13, further comprising where a full authorization cannot be generated by a receiving authorization module, forwarding the request for verification from said authorization module to one or more downstream authorization modules as a verification request.

16. The method of claim 13, further comprising receiving a returned verification request at an upstream authorization module, the returned verification request containing a positive verification, executing a verification request on the returned verification request to further verify the request and returning a verification answer to a module from which the request was originally received from based on an outcome of the verification executed at the upstream authorization module.

17. A method for authenticating a production of products, comprising:
electronically storing configuration data for a production run, wherein the configuration data for the production run specifies parameters used in the production of products;
receiving a request for authorization at an authorization module;
forwarding the request for authorization to one or more downstream authorization modules;
at a downstream authorization module, determining if the configuration data for the production run is authorized;
at the downstream authorization module, if the production run is authorized:
generating a set of security tokens and associating one or more of the security tokens with the configuration data;
digitally signing the configuration data by generating a digital signature and associating the digital signature with the configuration data;
transmitting the digitally signed configuration data and the digital signature and the one or more security tokens to an upstream authorization module where the request for authorization was received from;
receiving the digitally signed configuration data and the one or more security tokens at a production machine;
at the production machine, verifying the digitally signed configuration data;
calculating a set of secure product identifiers based on the digitally signed configuration data and the one or more security tokens;
producing products in a production run according to the digitally signed configuration data; and
applying the set of secure product identifiers on the products according to the digitally signed configuration data;
wherein a receiving authorization module determines if a production run is authorized and further configuration data exists that the receiving authorization module was not able to decipher and there are one or more downstream authorization modules to the receiving authorization module, and the receiving authorization module either:
a. forwards the request for authorization to a downstream authorization module without associating a security token with the authorization prior to forwarding; or
b. digitally signs the configuration data by generating a set of one or more security tokens and associating said one or more security tokens with the configuration data deciphered and authorized by the receiving authorization module and forwarding the request for authorization to one or more downstream connected authorization modules to determine if the run is authorized.

18. The method of claim 17, wherein a receiving authorization module is able to authenticate a production of products based on the configuration data received wherein the production would be authorized by any of one or more downstream authorization modules.

19. The method of claim 17, further comprising forwarding the request for authorization from a first downstream authorization module to one or more authorization modules downstream of the first downstream authorization module.

20. The method of claim 17, wherein a receiving authorization module receives an authorization from a downstream authorization module, digitally signing the configuration data by generating a set of one or more security tokens and associating the one or more security tokens with the configuration data authorized by the authorization received from the one or more downstream authorization module and transmitting the digitally signed configuration data and the one or more security tokens to an upstream module from which the request was originally received by the receiving authorization module prior to it being passed to a downstream authorization module for the first time.

21. The method of claim 17, wherein authorization modules are connected in parallel, forwarding the request from an upstream module to the downstream parallel authorization modules to obtain an authorization.

22. The method of claim 17, wherein the hardware security module further stores encryption and decryption keys, stored security tokens and authorizations.

23. The method of claim 17, wherein the digital signature is used as a security token.

* * * * *